Figure 1:
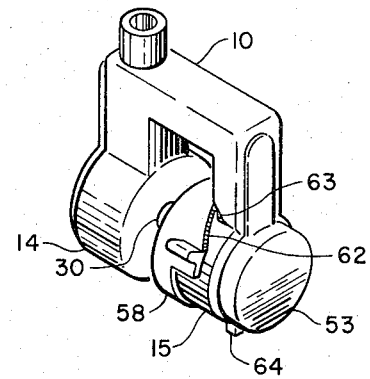

Dec. 26, 1967     A. P. SHERMAN     3,359,975
PULSE RATE SENSING DEVICE
Filed Oct. 23, 1965

INVENTOR.
ALLAN P. SHERMAN
BY
ATTORNEY 3,359,975
PULSE RATE SENSING DEVICE
Allan P. Sherman, Waltham, Mass., assignor to Hewlett-Packard Company, Palo Alto, Calif., a corporation of California
Filed Oct. 23, 1965, Ser. No. 502,967
6 Claims. (Cl. 128—2.05)

This invention relates to a pulse rate sensing device and, more particularly, to an improved pulse rate sensor capable of being securely fastened to the ear of a human being.

Many devices have been devised for automatically sensing the pulse rate of human beings as part of an automatic monitoring system. Some of these devices have used an ear cuff which is affixed to the pinna of the ear of the patient and includes energy transmitting end receiving members positioned on either side of the person's ear. The blood pulsing through the ear has the effect of amplitude modulating the amount of energy that passes through the ear to the receiving member. Thus, by merely counting the number of amplitude variations occurring over a predetermined time span, one has a means of determining pulse rate.

Of the several devices employed in the prior art, one had flexible rubber fingers for gripping the ear. While these flexible rubber fingers do engage the ear, they are not capable of securely gripping the ear and are easily knocked off, often merely by the movement of the patient. Additionally, if light is the energy source, stray light tends to leak in through the fingers and cause erroneous readings.

Another device of the prior art has employed a spring clip to clamp tightly the transmitting and receiving members on either side of the ear. In such devices it is often difficult to adjust the spring tension and, hence, in patients having thicker ears tends to cause some discomfort.

It is, therefore, an object of this invention to obviate many of the disadvantages of prior art ear cuff sensors.

Another object of this invention is to provide an improved ear plethysmograph having an adjustable mechanism for positively clamping the plethysmograph to the ear.

In a preferred embodiment of this invention a U-shaped base member is employed to position energy transmitting and receiving members on either side of the ear. Housings for the two members are formed respectively at the end of the upright arms of the U-shaped base member. A cylindrical end cap is fitted concentrically over a cylindrical shaped housing for one of the members and its walls are shaped to provide a ramp end surface which, when rotated relative to the upright of the body member, varies the spacing between the end cap and the body member thereby to engage the ear with an adjustable tightness. The ramp surface and the surface of the body member, which the ramp surface engages, may both be knurled to provide a more positive action.

Figure 2:
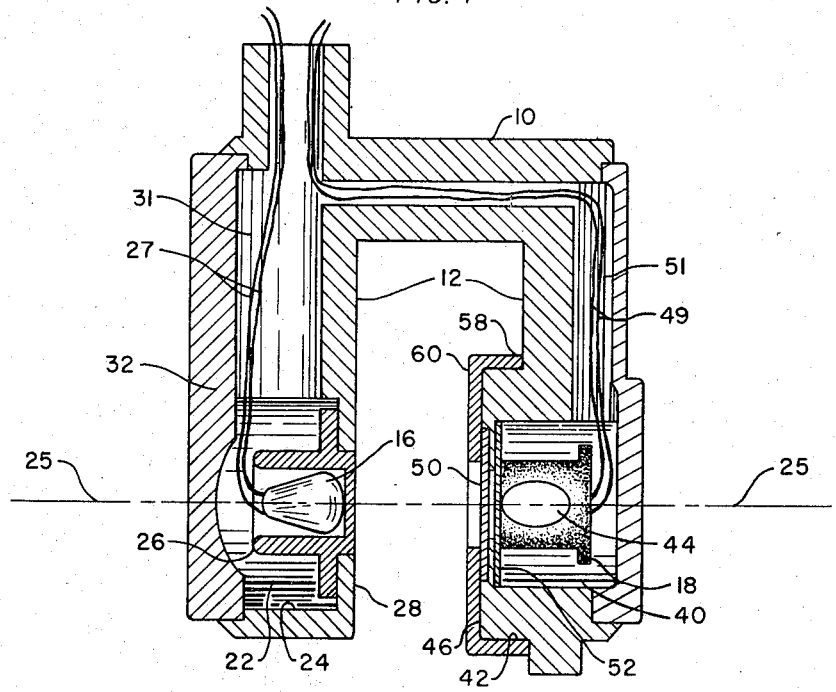

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is a plan view of a sensing device constructed in accordance with the present invention; and FIGURE 2 is a view partial in section taken along the line 2—2 of FIG. 1.

Referring now to the drawings in more detail there is shown in both of the figures the pulse rate sensing device which comprises an opaque U-shaped frame or base member 10 which may be molded of a suitable plastic such as one of the polycarbonate resins. The ends of each of the uprights 12 of the U-shaped base member 10 are in the form of hollow cylinders to provide respective housings, 14, 15 for an energy transmitting member 16 and an energy receiving member 18, respectively. More specifically, the transmitting member's housing 14 is in the form of a generally cylindrical body 22 having a central bore 24 whose axis 25 intersects both of the uprights 12. The central bore 24 does not extend throughout the cylindrical body 22 but rather stops just short of the lower end, in the drawing, thereby to provide an end face 28 that is normal to the axis. The end face 28 has a small opening 30 to permit the transmission of energy to the receiving member 18.

The transmitting member 16 may be no more than an electric bulb fitted into a molded lens 26 for transmitting light energy. The lens 26 is a clear, polycarbonate resin, molded and flanged and adapted to fit into the opening 30 in the transmitting housing 14. Wires 27 for the bulb may be passed through a slot or groove 31 formed in the outside of the upright member 12 of the body member 22 that supports the housing 14. A molded lamp cover 32 may be shaped to close the slot 31 and the end of the cylindrical body 22 and is cemented in position.

The receiving member housing 15 has a generally cylindrical body 40 having a central bore 42 therein to mount a photocell 44 selected to have the proper light range for the light transmitted through the ear. The central bore 42 is substantially coaxial with and lies on the same axis 25 as the central bore 24 of the transmitting member's housing 14. The cylindrical body 40 has an end face 46 normal to the axis 25 and facing the transmitting member's housing 14. The end face 46 has an opening therein to permit the passage of light energy from the bulb to the photocell 44. A cylindrical depression may be formed in the exterior surface of the receiver housing 15 to facilitate the placement of a disc-shaped transparent protector 50 which may be cemented to the housing 15. Wires 49 for the photocell may be placed in a groove or slot 51 formed in the outside of the upright member 12. A shaped plastic cover 53 may be cemented over the cavity 51 and the outer end of the cylindrical body 40. The base of the U-shaped base member 10 may be bored to accommodate the wires 27 from the bulb.

One suitable photocell for use as a receiving member is one available from Clairex and designated by the Stock No. 703L. A suitable bulb is one available from Chicago Miniature Lamp Works and bears stock No. CM 8–683–A515. A disc-shaped filter 52 such as available from Eastman Kodak Company, bearing the designation Kodak No. 96 1.0 N.D. may be fitted into the lower portion of the receiver housing so as to reduce the intensity of the light energy received by the photocell. All of the materials used herein, with the exception of the bulb, the photocell, the plastic cover 53, and the lens 26, which have been previously described, may be formed of an opaque plastic such as a polycarbonate resin. By cementing the several parts together, a sealed unit is obtained which facilitates cleaning and sterilizing for use on different patients.

In accordance with this invention the space between the transmitter housing 14 and the receiver housing 15, which fits over the ear, may be varied to engage or clamp the ear by the use of an end cap 58 which may be molded of a urethene plastic. This end cap 58 is cylindrical in shape and its end face 60 has a centrally disposed circular opening to permit the passage of light energy from the bulb. The end cap 58 fits snugly, but rotatably over the receiving member 18. In one form of the invention, the walls of the end cap 58 are cut at an angle so as to form ramp surfaces 62 thereon. Additionally, a stud 64 may be formed on the outer periphery of the housing 15 substantially in line with the upright 12 which supports the housing 15. These ramp surfaces 62 may be knurled to facilitate their engagement with the upright arm 12 and the stud 64. In like manner, that portion of the upright arm adjacent the housing 15, that is engaged by the ramp surface 62, is molded at an angle and similarly knurled to improve the locking of the end cap 58 to the surface. The stud 64 may be knurled or merely have a relatively sharp edge to engage the knurled ramp surface 62 of the end cap 58.

In an alternative embodiment of the invention the end cap 58 may be threaded with helical thread adapted to engage an external thread or suitable projections about the photocell housing 15. Also the inner surface of the end cap 58 and the end face 46 may have cooperating ramp surfaces. In either embodiment, rotation of the end cap 58 moves it along the axis 25 relative to the receiver housing so as to increase or decrease the space between the end cap 58 and transmitter housing 16. This decrease of space is employed to engage securely the ear of the patient.

In still another embodiment the end cap 58 may be molded having end faces 60 formed with walls of varying thicknesses thus to adapt the unit to persons having different ear thicknesses. The end cap having the proper thickness would be selected and placed over the unit for subsequent fitting over the ear.

There has thus been described a relatively simple, unique ear plethysmograph having an adjustable cap which facilitates the positive attachment or clamping of the unit to the ear of a patient.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A blood pulse rate sensing device adapted to position energy transmitting and receiving members on either side of the pinna of the ear, whereby the energy transmitted by said transmitting member passes through the tissue of the ear to the receiving member, said device comprising:
    a U-shaped, opaque base member having first and second arms,
    first and second oppositely-disposed housings in said first and second arms respectively each adapted to house a different one of said transmitting and receiving members, each of said housings having a common axis intersecting both of said arms,
    a hollow end cap adapted to encase one of said housings, said end cap having an end face with a central portion on said axis pervious to the transmission of energy between said members, and
    means to vary the spacing between said end face and one of said housings, thereby to engage the ear of a person whose pulse rate is to be sensed between one of said housings and said end cap.

2. The combination set forth in claim 1 wherein said end cap is cylindrical in shape, and said central portion constitutes an opening in said end face.

3. The sensing device set forth in claim 2 wherein said means to vary the spacing comprises a ramp surface formed by the walls of said end cap.

4. The combination set forth in claim 3 wherein mating ramp surfaces are formed on both said one arm and on said one housing, thereby to engage the ramp surface of said cap member.

5. The combination set forth in claim 4 wherein each of said ramp surfaces are knurled.

6. The device set forth in claim 1 wherein said means to vary the spacing includes ramp means on said cap member adapted to engage said one housing, and a mating member on the periphery of said one housing member, whereby movement of said cap member relative to said one housing member varies said spacing.

References Cited
UNITED STATES PATENTS

| | | | |
|---|---|---|---|
| 2,540,163 | 2/1951 | Brosene et al. | 128—2.05 |
| 2,944,542 | 7/1960 | Barnett et al. | 128—2.05 |
| 3,103,214 | 9/1963 | Smith | 128—2.05 |
| 3,139,086 | 6/1964 | Botsch et al. | 128—205 |

RICHARD A. GAUDET, *Primary Examiner.*

SIMON BRODER, *Examiner.*